(No Model.)

G. W. & F. P. MURPHEY.
CORN PLANTER.

No. 426,043. Patented Apr. 22, 1890.

ATTEST
Helen Graham
N. W. Graham

INVENTORS
G. W. Murphey.
F. P. Murphey.
By L. P. Graham
their attorney.

UNITED STATES PATENT OFFICE.

GEORGE W. MURPHEY AND FRANK P. MURPHEY, OF DECATUR, ILLINOIS.

CORN-PLANTER.

SPECIFICATION forming part of Letters Patent No. 426,043, dated April 22, 1890.

Application filed September 27, 1889. Serial No. 325,293. (No model.)

*To all whom it may concern:*

Be it known that we, GEORGE W. MURPHEY and FRANK P. MURPHEY, of the city of Decatur, county of Macon, and State of Illinois, have invented a certain Improved Corn-Planter, of which the following is a specification.

Our invention relates to check-row corn-planters; and it is our object to decrease the draft without lessening the accuracy of the checking and to avoid side draft by diminishing the strain on the check-row line. To this end we use seed-depositing prods that displace only sufficient soil to properly receive the grain, thus decreasing draft. We operate the prods from the carrying-wheels of the planter, thus taking nearly all the strain off the check-row line, and we use a knotted check-row line to intermittently connect the wheels with the gearing of the prods, thus insuring accurate check-rows.

Figure 1:
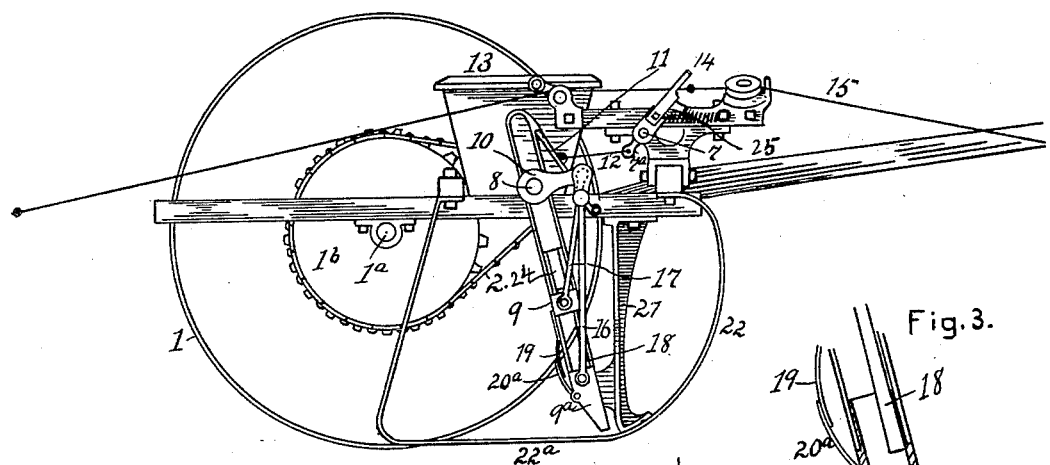
Figure 2:
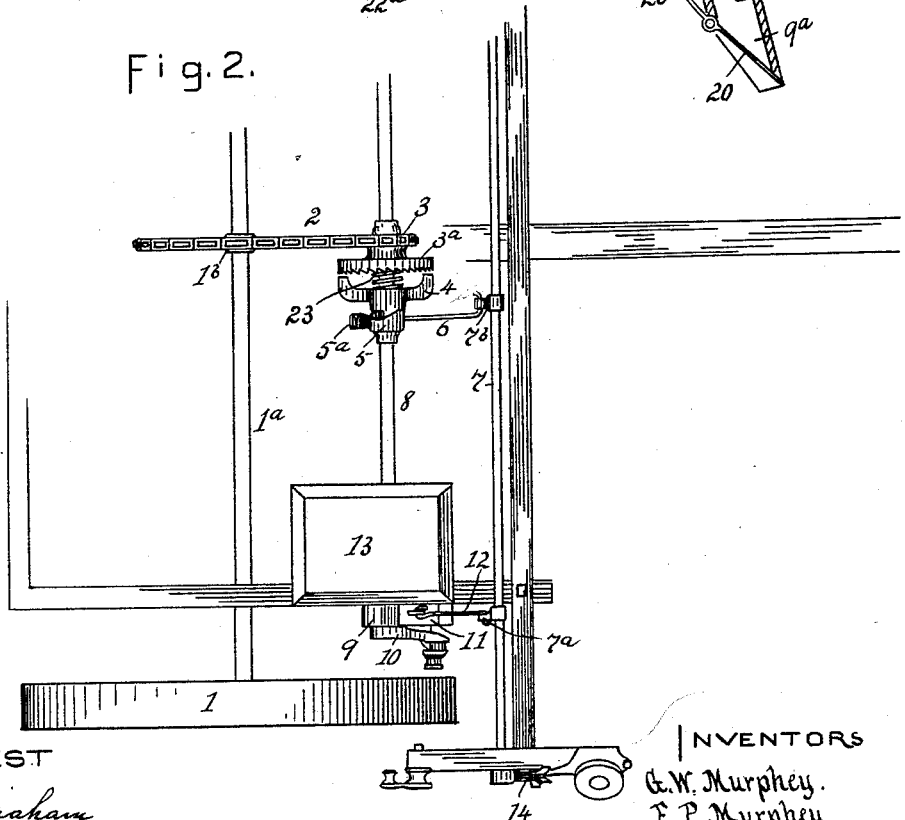

In the drawings accompanying and forming a part of this specification, Figure 1 represents in side elevation a planter embodying our invention, the near carrying-wheel being removed to expose essential parts. Fig. 2 is a plan of a portion of the device and Fig. 3 is a vertical section of the lower end of a seed-depositing prod.

The wheels 1 are mounted on axle $1^a$ in such manner that the forward motion of the wheels is imparted to the axle, and the sprocket-wheel $1^b$ is keyed on the axle or otherwise rigidly secured thereto. The link-belt 2 connects the sprocket-wheel $1^b$ with the sprocket-pinion 3, which is integral with ratchet-wheel $3^a$, and which rotates loosely on crank-shaft 8. The clutch 4 is splined on the shaft and has an inclined surface at its end, by means of which it is thrown in mesh with the ratchet-wheel. The spring 23 tends to hold the clutch out of contact with the ratchet-wheel, and in addition to this a trip or incline may be provided that will act positively to separate the ratchet-wheel from the clutch at the termination of each complete rotation of the clutch and crank-shaft. The collar 5 is mounted to rock loosely on the crank-shaft, is held against longitudinal motion, and is adapted to the bevel of the clutch. It has an arm $5^a$, that connects by means of rod 6 with arm $7^b$ on the check-row shaft 7. The prod 9 is adapted to carry grain, and it is forced into the ground at proper intervals, and the grain discharged by means of crank 10 on shaft 8. Detent 11 holds the prod out of the ground and also holds the point of the prod in contact with the guide-leg 21. A rod 12 connects the detent with the arm $7^a$ on the check-row shaft, and the said shaft has a forked lever 14, (one at each end,) that receives motion from the knots of the check-row line 15. The prod is preferably provided with a plunger 18, that opens the prod-valve and forces out the grain, and the crank is double to provide means for operating the plunger in the prod. A pitman 16 connects one bearing of the crank with the prod, and pitman 17 connects the other bearing of the crank with the plunger. A shoe 22, (seen only in Fig. 1,) forms a runner to ride over obstructions, and it is slotted at $22^a$ to permit the prod to penetrate the ground and swing backward. The lower end $9^a$ of prod 9 has valve 20, as seen in Fig. 3. This valve has the upward extension $20^a$, against which spring 19 presses to hold the valve closed.

The prod may carry grain after the manner of a hand-planter; or, which is deemed preferable, the box 13 may have an ordinary "drop" operated by a worm on shaft 8, or by other readily-obvious means, and the corn may be conveyed from the box to the prod-point by a swinging chute after the manner of grain-drill conveyers or by means analogous thereto. Such a chute is shown at 24 in Fig. 1.

A complete machine has two prods on opposite ends of the crank-shaft, and has a driver's seat and other adjuncts common to planters. These, however, are readily-obvious points, not affecting the principle of the invention, and consequently are not shown.

In operation the prods are held by the detents until a lever 14 is acted on by a knot of the check-row line. Then the detents are released from the prods, the clutch is thrown in mesh with the continuously-revolving ratchet-wheel, the cranks are rotated, thereby forcing the prods into the ground and discharging the corn, the prods swing backward to accommodate the forward motion of the planter, and, finally, at the completion of a rotation of the crank-shaft the prods will be arrested by the detents and the clutch will be disconnected from the ratchet-wheel. The check-row shaft has the customary reactionary movement, which is imparted by a spring or equivalent, (see 25, Fig. 1,) and the collar 5 is so constructed with relation to the clutch that just previous to the completion of each rotation of the crank-shaft the clutch is permitted or forced to move from contact with the ratchet-wheel.

We claim as new and desire to secure by Letters Patent—

1. A corn-planter comprising a frame and carrying-wheels, a crank-shaft having seed-depositing prods, clutch-gearing connecting the carrying-wheels with the crank-shaft, check-row levers adapted to actuate the clutch-gearing, and a knotted check-row line adapted to the levers, as set forth.

2. A corn-planter comprising a frame and carrying-wheels, a crank-shaft having seed-depositing prods, clutch-gearing connecting the carrying-wheels with the crank-shaft, a detent or detents to arrest the rotation of the crank-shaft, check-row levers adapted to actuate the clutch-gearing and release the detents, and a knotted check-row line adapted to the levers, as set forth.

3. In corn-planters, in combination, a seed-depositing prod having swinging motion, and a depressing-shoe contiguous to the swing of the prod, as set forth.

In testimony whereof we sign our names in presence of two subscribing witnesses.

GEO. W. MURPHEY.
FRANK P. MURPHEY.

Attest:
I. D. WALKER,
L. P. GRAHAM.